June 21, 1960 R. F. PFOST ET AL 2,942,061

TAPE TRANSDUCING APPARATUS

Filed March 10, 1958 9 Sheets-Sheet 1

INVENTORS.
Robert F. Pfost
William Barnhart

BY

[signature]

ATTORNEYS.

June 21, 1960 R. F. PFOST ET AL 2,942,061

TAPE TRANSDUCING APPARATUS

Filed March 10, 1958 9 Sheets-Sheet 2

INVENTORS
Robert F. Pfost
William Barnhart
BY
[signature]
ATTORNEYS

June 21, 1960 R. F. PFOST ET AL 2,942,061

TAPE TRANSDUCING APPARATUS

Filed March 10, 1958 9 Sheets-Sheet 3

INVENTORS
Robert F. Pfost
William Barnhart
BY [signature]
ATTORNEYS

INVENTORS
Robert F. Pfost
William Barnhart
BY Flehr & Swain
ATTORNEYS

INVENTORS
Robert F. Pfost
William Barnhart
BY Flehr and Swain
ATTORNEYS

June 21, 1960 R. F. PFOST ET AL 2,942,061

TAPE TRANSDUCING APPARATUS

Filed March 10, 1958 9 Sheets-Sheet 6

INVENTORS
Robert F. Pfost
William Barnhart
BY [signature]
ATTORNEYS

INVENTORS
Robert F. Pfost
William Barnhart
BY Fleher & Swain
ATTORNEYS

INVENTORS
Robert F. Pfost
William Barnhart
BY
Flehr & Swain
ATTORNEYS

June 21, 1960 R. F. PFOST ET AL 2,942,061

TAPE TRANSDUCING APPARATUS

Filed March 10, 1958 9 Sheets-Sheet 9

INVENTORS
Robert F. Pfost
William Barnhart

BY [signature]

ATTORNEYS

United States Patent Office 2,942,061

Patented June 21, 1960

2,942,061

TAPE TRANSDUCING APPARATUS

Robert F. Pfost, Mountain View, and William Barnhart, Palo Alto, Calif., assignors to Ampex Corporation, Redwood City, Calif., a corporation of California Filed Mar. 10, 1958, Ser. No. 720,329

15 Claims. (Cl. 178—6.6)

This invention relates generally to tape transducing apparatus making use of a pliable tape-like record medium. It is applicable to the reproduction of signal intelligence over a wide frequency range, including, for example, video frequencies.

In copending applications Serial No. 524,004, filed July 25, 1955, and Serial No. 427,138, filed May 3, 1954, now Patent No. 2,916,546 there is disclosed a system and apparatus making use of a rotary head assembly for recording and/or reproducing signal intelligence which occupies a relatively wide frequency spectrum. The head assembly employs one or more transducer units or heads which are mounted to rotate and sweep across a pliable tape-like medium, such as that which is commonly known as magnetic tape. A concave guide serves to hold the tape in a cupped condition to conform to the sweep path of the transducing unit and to guide the same past the units whereby the units make continuous pressure contact with the tape as they sweep across the same. Special means are employed for driving the head assembly and magnetic tape to assure proper speed of rotation of the head assembly and the tape past the heads and to insure proper tracking of the head with the recorded track portion during play-back.

Systems of the above character necessarily involve separate recorded track portions extending across the tape, each track portion being formed by the sweep of a transducing unit. During play-back, current variations provided by each transducing unit as it sweeps across the track portions are combined to form a composite signal corresponding to the original recorded signal.

One practical use of systems of the character described is the recording and/or reproducing of television program signal intelligence.

The position of the concave tape guide determines the depth to which the rotating heads or units indent the tape as they scan across the same. A certain amount of pressure between the tape and transducing units is necessary to assure proper head to tape contact to prevent dropout. However, excessive pressure between the heads and tape results in unnecessary wear in both the tape and the transducing unit. As a result of the pressure existing between the transducing units and the tape, the tape is stretched along the length of the track as it is swept by the heads. The pressure between the tape must be controlled during reproduction or time displacement errors are introduced. The amount of stretch effects the time it takes a head to scan two points of information on the tape. A difference in the time it takes the head to scan two points of information on the tape during recording and reproduction leads to timing errors in the reproduced signal. Other factors which might introduce timing errors, differences in sweep time between recording and reproducing, are wear of the transducing units whereby the same sweep a different radius, contraction and expansion of the various parts due to temperature changes, and stretching or shrinkage of the magnetic tape due to temperature and humidity changes.

In copending application Serial No. 689,594, filed Oct. 11, 1957, there is disclosed a transducing apparatus including a rotary head and tape guide means which makes possible precise adjustment of the contact pressure between the tape and the tape transducer units.

It is a general object of the present invention to provide a transducing apparatus in which the tape pressure is automatically adjusted.

It is another object of the present invention to provide a servo system which is responsive to time displacement errors and which serves to automatically control the pressure between the transducing units and the tape.

It is another object of the present invention to provide a recording and/or reproducing system of the above character in which a servo system automatically adjusts the pressure between the tape and the transducing units in response to an error signal derived from the reproduced signal.

It is another object of the present invention to provide a novel unit for deriving an error signal from the reproduced signal.

These and other objects of the invention will become more clearly apparent from the following description when taken in conjunction with the accompanying drawing.

Referring to the drawing.

Figure 1:
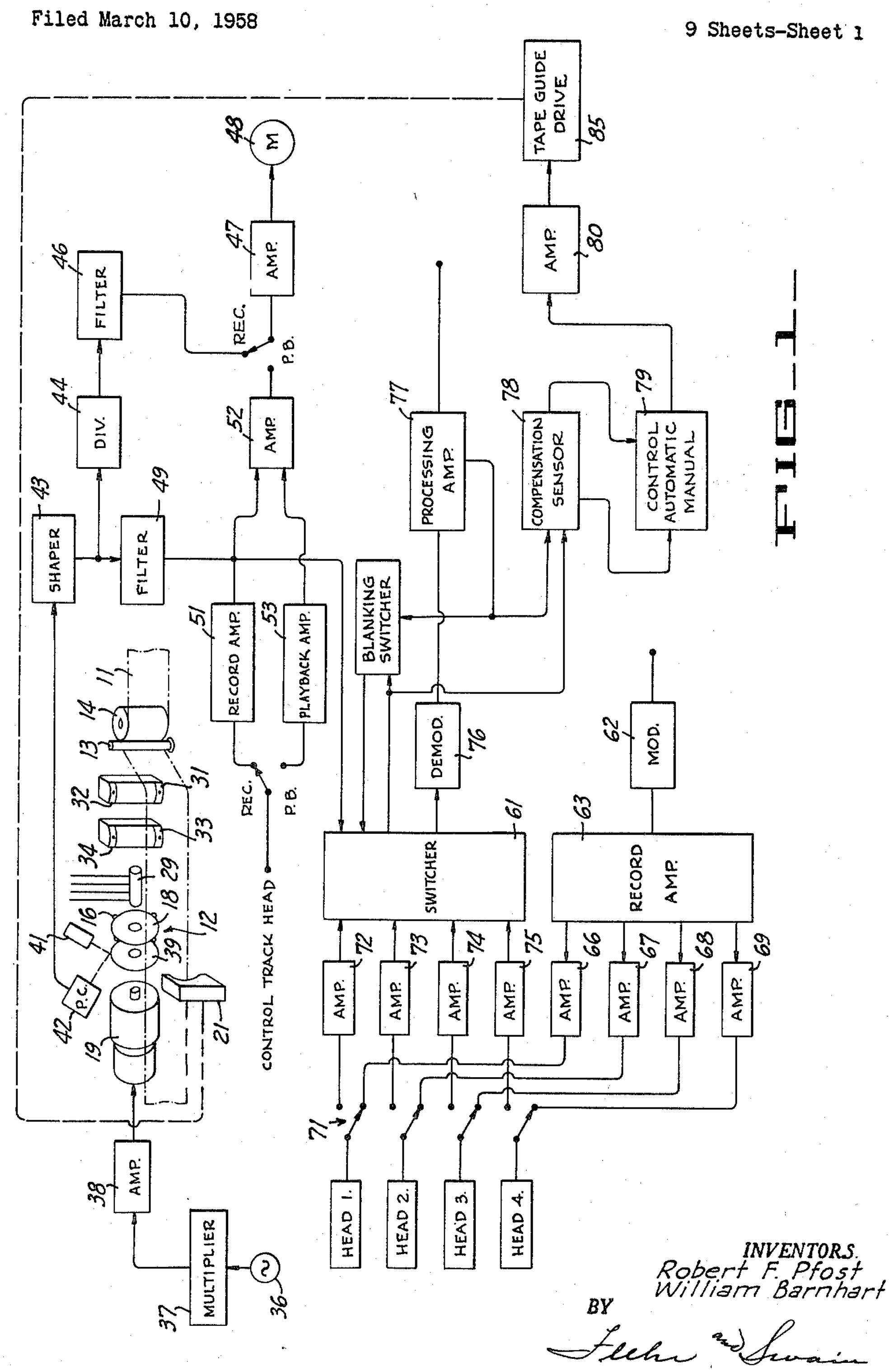
Figure 1 is a block diagram schematically illustrating magnetic tape recording and/or reproducing apparatus in accordance with the present invention.
Figure 2:
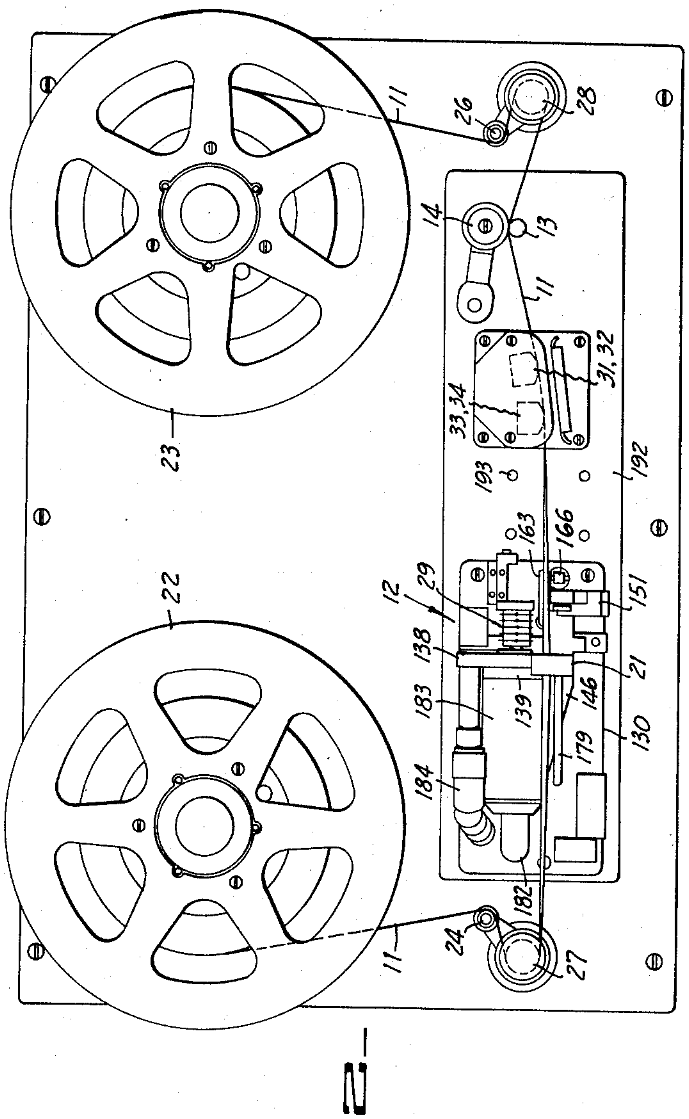
Figure 2 is a plan view illustrating a suitable tape transport assembly.

Referring to Figures 1 and 2, the magnetic tape 11 is driven lengthwise past the transducing head assembly 12 by means of a capstan drive 13 acting in conjunction with a capstan idler 14. A plurality of transducing heads or units 16 are carried on the periphery of a disc or drum 18 which is driven by a synchronous motor 19. Suitable guide means 21 serve to cup the tape as it is drawn past the transducing units. As the transducing units sweep a circular path, the tape is in continuous pressure contact with the transducing units. The tape 11 is supplied from a supply reel 22 and wound onto a take-up reel 23. The tape is guided past the transducing head assembly designated generally by the reference numeral 12 by suitable self-aligning guide posts 24 and 26, and rollers 27 and 28. The supply and take-up reels may be carried on turntables in accordance with customary practice. Suitable motors may be provided for the turntables associated with the reels in accordance with customary practice.

In operation, at least one head is always in contact with the tape as previously described. The heads are connected to the electronic elements of the system by a commutator 29, schematically illustrated in Figures 1 and 2. The commutator may, for example, include slip rings connected to each of the heads and stationary brushes serving to make sliding contact with the associated rings.

During recording of signal intelligence, the rotational velocity of the head drum 18 and of the capstan 13 are maintained with a specified relationship. During the reproducing process the relationship of rotational velocity of the head drum 18 and capstan 13 is maintained the same as during recording within narrow limits. For this purpose, a control signal is recorded on a control track along the lower edge of the tape by a magnetic transducing device 31. The control signal is recorded as a control track during recording and during reproduction, it is reproduced, amplified and used to control the relative speeds of the drum and capstan drive in a manner to be presently described in detail. A recording head 32 serves to record the sound information on the other side margin of the magnetic tape. Control track and sound track erase heads 33 and 34 may precede the heads 31 and 32, respectively.

The electronic circuitry illustrated in the block diagram of Figure 1 may be divided into the speed control circuitry and the signal electronic circuitry. For a more clear understanding of the invention, the two circuits are separately described.

A control frequency source 36 provides the control frequency for the apparatus during record and reproduce operations. The frequency 36 may, for example, be the 60 cycle line frequency, or it may be derived from a crystal controlled oscillator. The frequency of the source 36 will hereinafter be assumed to be a 60 cycle frequency. This signal frequency is applied to a multiplier 37 which serves to multiply the frequency to provide a higher frequency signal to the amplifier 38. In the discussion that follows, it is assumed that the multiplier multiples by 4 whereby the frequency applied to the amplifier 38 is a 240 cycle signal. The amplifier 38 is preferably a three phase power amplifier suitable for driving the three phase synchronous motor 19. As previously described, the motor 19 drives the head drum 18 which carries the transducer units or heads 16.

A revolving disc 39 coated half black and half white is carried by the motor shaft. A suitable light source 41 is focused on the disc and the reflected light is received by a photocell 42. The output of the photocell 42 is approximately a squarewave having a frequency equal to the rotational velocity of the motor 19. For the example cited, the output squarewave signal will have a frequency of 240 cycles.

The output of the photocell 42 is passed through a shaper 43 and applied to a frequency divider 44 which serves to divide down the frequency. In the instant example, th divider 44 divides by 4 to provide a 60 cycle frequency to the filter 46. The filter 46 is preferably a band pass filter which forms an output signal of substantially sinewave form. During the record operation the output of the filter 46 is applied to an amplifier 47, and the amplified signal is employed to power the capstan drive motor 48. Thus, the capstan motor is driven at a rotational velocity which is directly related to the rotational velocity of the head drum 18. In essence, the capstan is enslaved to the head drum. The tape moves a predetermined distance lengthwise during each complete revolution of the head drum.

The output from the shaper 43 is also applied through a filter 49 to a control track amplifier 51 which supplies its output signal to the control track record head 31 during a recording operation.

During reproduction the control signal 36 is again applied to the multiplier 37 and amplified and fed to the synchronous motor 19. The motor drives the head drum at approximately the correct rotational velocity for the purposes of tracking the previously recorded transverse record. The photocell 42 again derives a signal which is shaped and passed through the filter 49. The signal from the filter 49 is fed to a phase comparator in the capstan servo amplifier 52. A second signal is applied to the phase comparator from the control track amplifier 53 which is connected to receive the output signal from the control track head during reproduction. The comparator produces a resultant signal having a frequency which is a function of the phase difference between the signals from the control track and photocell. This signal is applied through a filter to the grid of a reactance tube which is one of the frequency determining elements of a conventional Wein bridge oscillator. The oscillator functions normally at the recording frequency (in the illustrative examples, 60 cycle) but the frequency is modified up and down by the signal from the phase comparator. The output signal is fed to the amplifier 47 which drives the capstan motor and controls its rotational velocity. Thus, the capstan motor advances the tape a predetermined distance during each revolution of the head drum whereby the plurality of heads 16 accurately track the record tracks on the recorded pliable magnetic tape.

The effect of the system described is to cause the capstan 13 to revolve during reproduction in exactly the same relationship to the revolving drum 18, within narrow limits, as it did during the recording process. Once the drum is adjusted on the center of a track at the beginning of a reproduction, the system automatically holds the relationship constant and the revolving heads indefinitely trace accurately the recorded transverse tracks. A suitable control system is described in copending application Serial No. 506,182, filed May 5, 1955, now Patent No. 2,915,357.

As previously described, the lower portion of Figure 1 includes the signal electronic circuitry. The only connection between the signal electronics and the control electronics is the output filter 49 connected to the switcher 61. The signal from the filter 49 is employed, as will be presently described, to control the switching from one playback head to the next during reproduction to form a composite signal corresponding to the recorded signal.

The record electronics can consist of suitable means for producing a modulated carrier together with suitable recording amplifiers. FM recording is preferred, although AM may be used. Assuming the use of FM recording, the record electronics can include a modulator 62 which receives the input signal and a record amplifier 63 connected to receive the output of the modulator. The output from the record amplifier 63 is continuously applied to the individual head amplifiers 66—69. During recording the switch 71 is positioned to connect the heads 1—4 to the amplifiers 66—69.

As described above, it is preferable to use FM recording. The type of FM recording which can be used for satisfactory recording and reproduction of video images is disclosed in copending application Serial No. 524,004, filed July 25, 1955. It is also described in copending application Serial No. 552,868, filed Dec. 13, 1955, now Patent No. 2,921,990.

During reproduction the switch 71 is connected whereby the output of each head is fed individually to its own preamplifier 72—75. The preamplifiers are connected to feed their output to a switcher 61. From the switcher a single channel frequency signal (combined signal) is fed to the demodulator 76. The switcher serves to electronically switch to the individual outputs of the amplifiers 72—75 sequentially and alternately as the respective heads are swept across the tape. The output of the switcher is a composite signal corresponding to the recorded signal.

Figure 11:
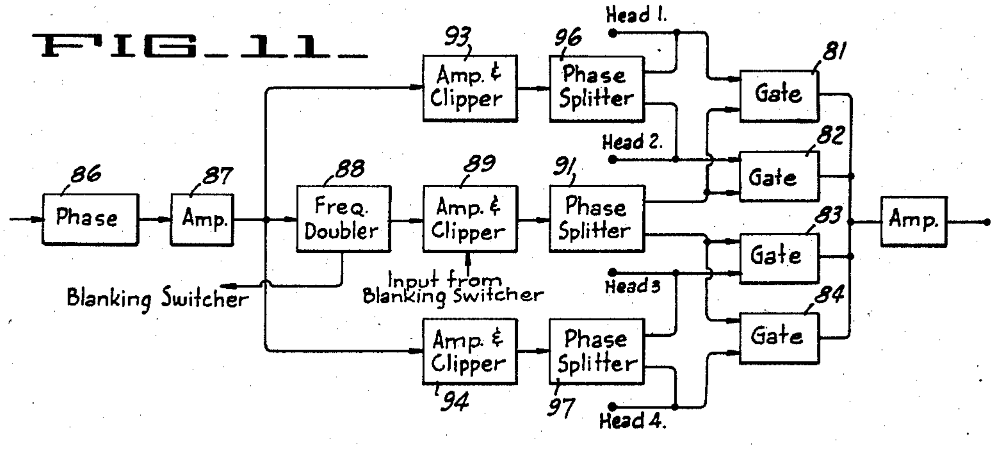
Figure 11 is a block diagram schematically illustrating a switcher suitable for performing the switching operations in the apparatus of Figure 1.

It is apparent that during reproduction it is necessary to derive the amplified output signal from one head at a time, switching from one preamplifier to the next at a moment in the signal when minimum disturbance will be introduced in the reproduced signal. An electronic switcher may be employed and may be of the type described in copending application Serial No. 614,420, filed October 8, 1956. Said switching system is schematically illustrated in Figure 11 and includes four gated tubes 81—84 which act as individual switches for the signals from each of the four preamplifiers. Gating pulses for these tubes are derived from the initial squarewave generated by the photocell. The squarewave is amplified and filtered and enters the switcher as a 240 cycle sinewave. The duty of the switcher is to develop from this initial timing signal the propagating pulses necessary for switching the tubes 81—84 at the proper instant in time.

The 240 cycle input from the photocell passes through the variable phase shift circuit 86 and is amplified by an amplifier 87. Frequency doubling is performed by applying the signal to a full wave rectifier whose fundamental output frequency is 480 cycles. Harmonics are removed by a band pass filter to provide a pure 480 cycle signal to the amplifying and clipping stage 89. The reference numeral 88 refers to the combination of full wave rectifier and filter described. The amplifying and clipping stage 89 transforms the input into a steep sided squarewave or pulse. This pulse is then applied to the phase splitter 91 whose two outputs are 180° out of phase. The in phase pulse is fed to the suppressor grids of the gating tubes 81 and 82 and the out of phase components are fed to the suppressor grids of the tubes 83 and 84.

The 240 cycle signal from the amplifier 87 is also fed to two identical amplifying and clipping means 93 and 94. After entering one of these channels one of the signals is shifted 90° with respect to the other. The output from these channels is passed through phase splitters 96 and 97 to thereby develop four squarewave signals which are in phase quadrature. These four signals are the four pulses used as enabling or gating pulses for the gating tubes 81—84. They are applied to the control grid along with the reproduced signal from the respective pickup head. When reproducing television information, it is desirable to employ a blanking switcher in conjunction with the switcher to provide timing information to cause the switching action during the horizontal blanking interval.

Figure 12:
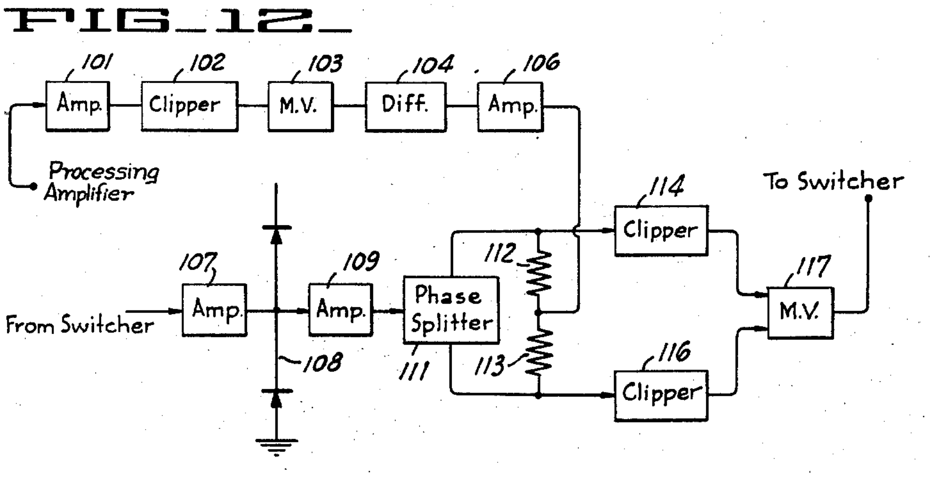
Figure 12 is a schematic block diagram showing a suitable blanking switcher for use with the system illustrated in Figure 1.

Figure 12 shows a block diagram of a suitable blanking switcher. The composite reproduced video signal is fed to an amplifier 101 and clipper 102 whose output is made to lock in a 15.75 kc. free running multivibrator 103. The trailing edge of the multivibrator pulse controls the switching time. A variable control is provided in the multivibrator whereby the switching time may be adjusted within the back porch interval. The squarewave output of the multivibrator 103 is differentiated by the differentiator 104, and clipped and amplified by the amplifier 106 to produce a sharp pulse corresponding to the trailing edge of the squarewave. At the same instance, the 480 cycle keying signal from the switcher is clipped and amplified by the amplifier 107 and applied to the phase splitter 108. The output of the phase splitter is applied to the amplifier 109 where it is amplified and applied to another phase splitter 111. The 15.75 kc. pulse waveforms are added to the output of the phase splitter through resistors 112 and 113. The sum waveform is then clipped by clippers 114 and 116 and applied to a multivibrator 117 which forms a squarewave output. Triggering of the multivibrator is so designed that pulses from the top channel will cause the multivibrator to flip only one polarity, while pulses from the lower channel cause the multivibrator to flip in the opposite polarity. The first pulse occurring in each group causes the multivibrator to flip. Both edges of the output squarewave correspond in time to the back porch video blanking interval. The output of the multivibrator 117 is applied to the amplifier clipper 89 to regulate the switching time so that it occurs during the horizontal retrace of a video signal.

As previously described, the output of the switcher is applied to demodulator 76 which serves to form a demodulated composite signal. When reproducing television signal intelligence, the demodulated signal is applied to a processing amplifier 77. The processing amplifier is designed to make final output of the reproduced signal acceptable for rebroadcast or retransmission. Its main purpose is to eliminate all abjectionable noise from (or in between) the blanking and sync pulses; and to limit to specified peak levels any noise during the picture interval. In addition, the processing amplifier provides means for correcting video linearity, and local or remote control of both video and sync levels. A processing amplifier suitable for performing these operations is described in detail in copending application Serial No. 636,536, filed January 28, 1957.

As previously described, the position of the concave tape guide 21 determines the pressure between the rotating heads and the tape. It is essential that the pressure be adjusted during reproduction so that there is no time displacement error in the reproduced signal. This is accomplished by a tape guide servo system. Generally, the servo system comprises a compensation sensor 78 which provides an error signal to the control 79 which may be set for manual or automatic control of the tape guide. The output of the control is applied to the amplifier 80 which powers the tape guide drive 85. The tape guide drive drives the guide 21 to control the pressure between the tape and heads. In the reproduction of a television program the compensation sensor 78 responds to errors occurring when the period between leading edges of two horizontal sync pulses, which occur just prior to and just following head switching, is different from the average period between leading edges of sync during the time one head is scanning. The compensation sensor receives horizontal sync pulses from the ouput of the processing amplifier 77 and receives 480 cycle control pulses from the switcher 61.

The rotary head assembly, guide, drive and associated parts are illustrated in detail in Figures 4–10. The head assembly, as previously described, includes a plurality of transducer units or heads 16 which are arranged on the periphery of a head disc or body 18. Along one side of the head assembly there is a tape guide 21 which is adapted to present the tape to the rotary head assembly. A base 130 serves to carry the operating parts and can be mounted on the top plate or panel 192 of a complete machine.

The head assembly, as previously described, consists of a body 18 on which is mounted a plurality of transducer members 16 which protrude from the margin of the same. The body 18 may be formed of suitable rigid metal or metal alloy. A central opening 132 is formed in the body 18 and serves to accommodate the motor shaft 133. A more complete description of the construction and assembly of a suitable head assembly is found in copending application Serial No. 689,594, filed Oct. 11, 1957.

The head assembly 12 is associated with a suitable slip ring assembly 29 whereby terminal leads numbered 1–4 inclusive make connection with one terminal of each of the transducer windings. Lead No. 5 and the slip ring associated therewith are provided as a ground connection. The inner or rotatable part of this slip ring assembly can be attached to a spider 134, and this spider, together with the head member 18 and a driving hub 136 on the motor shaft are all clamped together by means of screws 137. A part of the head periphery can be enclosed by a housing 138 which is carried on the base 130.

The adjacent housing parts 139 can serve to mount and enclose the photoelectric tube or photocell 42 and lamp 41, together with means for focusing the same upon the periphery of the ring or disc 39 carried on the hub 136. As previously described, one portion of the periphery can be darkened, and the remainder be light reflecting whereby circuitry connected to the photoelectric tube serves to generate squarewave pulses in synchronism with rotation of the heads. Such pulses are then used for motor control and synchronizing operations as previously described.

The tape guide 21 is provided with an arcuate inner face 144 which embraces a portion of the periphery of the head assembly. It is fixed to an arm 146 which overlies the base 130 and which has one end removably attached to a pivot pin 147. The pivot pin 147 is carried by a bearing assembly 148 and is shown releasably attached to the arm by means of a set screw 149. The guide member 21 together with the arm 146 is movable between limiting positions, in one of which the guide member is retracted with respect to the head assembly whereby a tape is free to move past the guide means without being contacted by the transducer units, and in the other of which the guide is advanced relative to the head whereby the tape is held in pressure contact with the transducing units or heads 16 carried by the head body 18.

Means is provided whereby the guide member 21 is normally urged toward the head assembly. Thus, a lever 151 is urged by a compression spring 152, and is secured to the base 130 by a pivot pin 153. A roller 154 is carried by one end of the lever and engages an inclined cam surface 156 formed on the extension 157 of the arm 146. By virtue of the cam face 156 and roller 154, the force of the spring 152 normally serves to yieldably urge the arm and guide towards the head and downwardly towards the base 130.

A stop screw 158 carried by the extension 157 of the arm 146 engages a bearing assembly 161 carried by the shaft 162. An arm 163 has its one end secured to the shaft 162 and its other end is disposed to engage an adjustable stop screw 164 which is carried on the actuator arm 166 of the tape guide drive, to be presently described.

Suitable motor means such as a solenoid 167 of the rotary type is mounted below the base 130 and has its shaft coupled to the shaft 162 that is journalled within the base, and which has the stub shaft 168 eccentrically attached thereto. When the solenoid 167 is energized, the tape guide member 21 is in its advanced position, and the arm 163 is against the stop screw 164. When the solenoid 167 is not energized, as for tape rewind operations, the arm 163 is rotated a limited amount in a counterclockwise direction as viewed in Figure 4, whereby the eccentricity between the shafts 162 and 168 cause displacement of the arm 163 with the result that the guide member is retracted for free movement of the tape with respect thereto.

When it is desired to remove the guide 21 together with the arm 146 from the machine, the operator operates the lever 151 to compress the spring 152 to release the roller 154 with respect to the cam surface 156. Thereafter, the arm 146 can be removed together with the guide.

It is desirable to steady the arm 146 by supplemental means near its free end. It is also desirable to provide means for adjusting the vertical height of the guide means whereby the height of the arm 146 may be controlled. For this purpose a slide bar assembly 171 is fitted within an accommodating slot formed in the base 130. The slide bar assembly has one of its ends fixably secured to the base by means of a bolt 172. The other end is adjustably secured to the base 130 by means of a bolt 174 which has a differential thread arrangement for adjusting the height of this end of the slide bar assembly. Vertical movement of the slide bar serves to vertically position the arm 146 which rests thereon. Teflon inserts 176 (Figure 8) are secured to the slide bar for the purpose of providing smooth low friction suspension points on which the arm can move.

Figure 4:
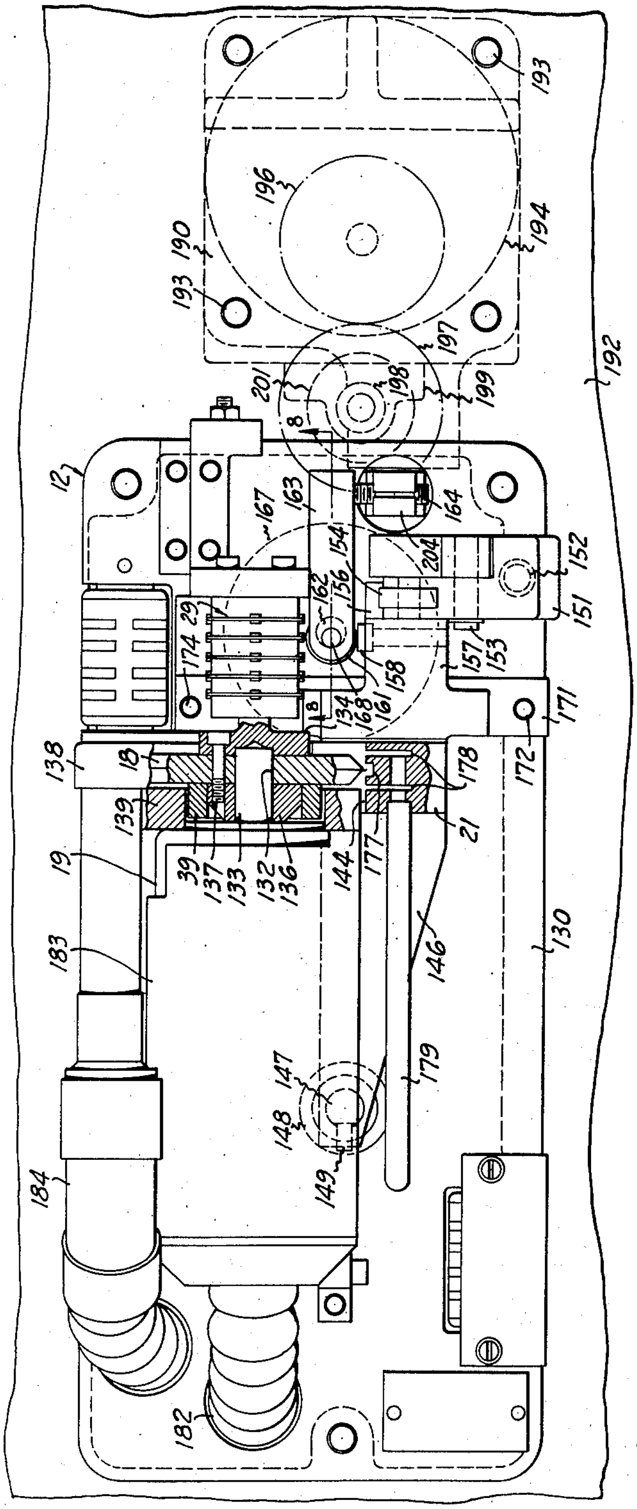
Figure 4 is a plan view illustrating tape transducing apparatus incorporating the invention.
Figures 5, 6:
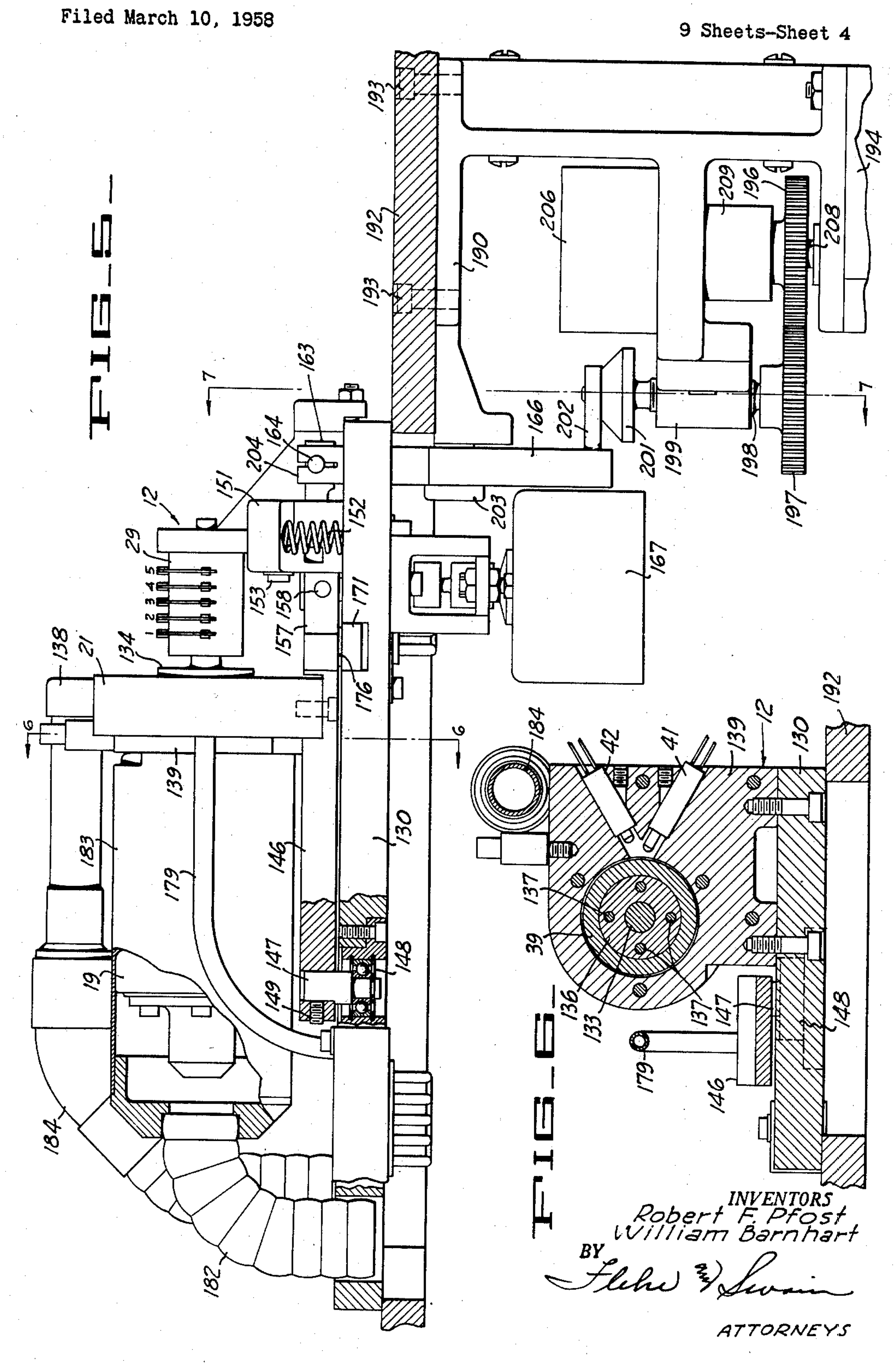
Figure 5 is a side elevational view illustrating the apparatus of Figure 4.
Figure 6 is a sectional view taken along the lines 6—6 of Figure 5.
Figure 7:
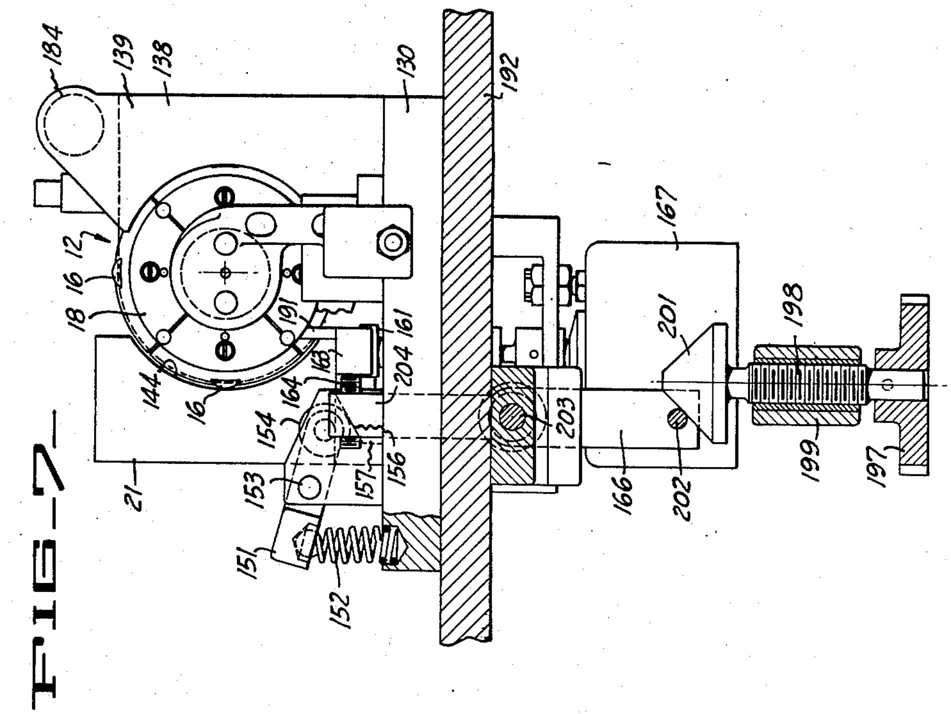
Figure 7 is a sectional view taken along the lines 7—7 of Figure 5.
Figure 8:
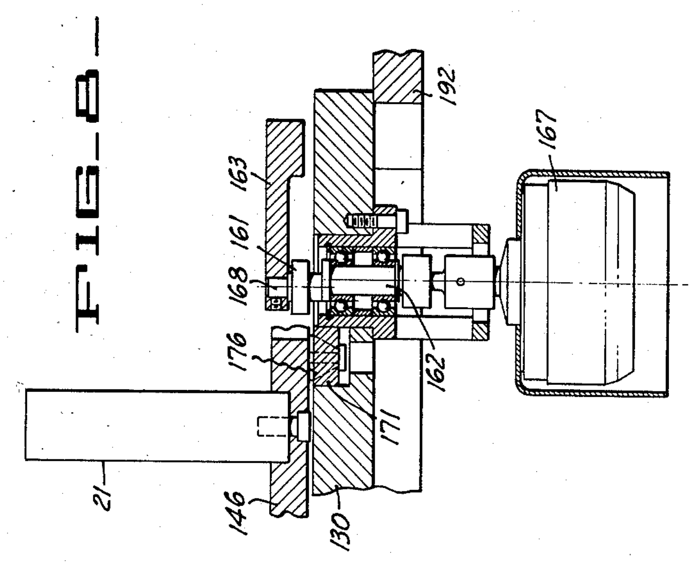
Figure 8 is a sectional view taken along the lines 8—8 of Figure 4.
Figure 10:
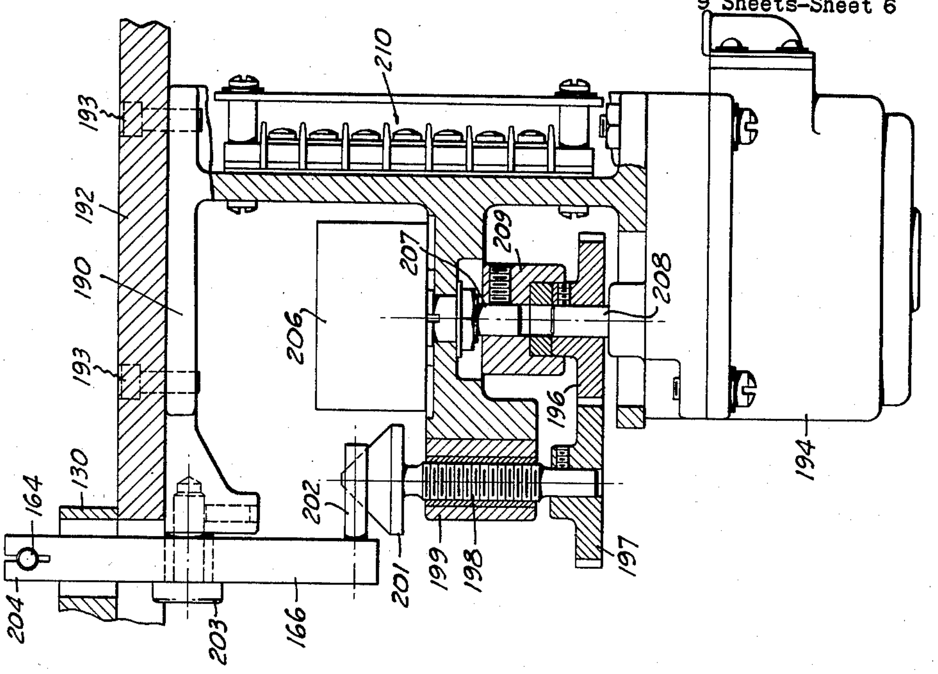
Figure 10 is a side elevational view illustrating the tape guide positioning apparatus of Figures 4 and 5.
Figure 9:
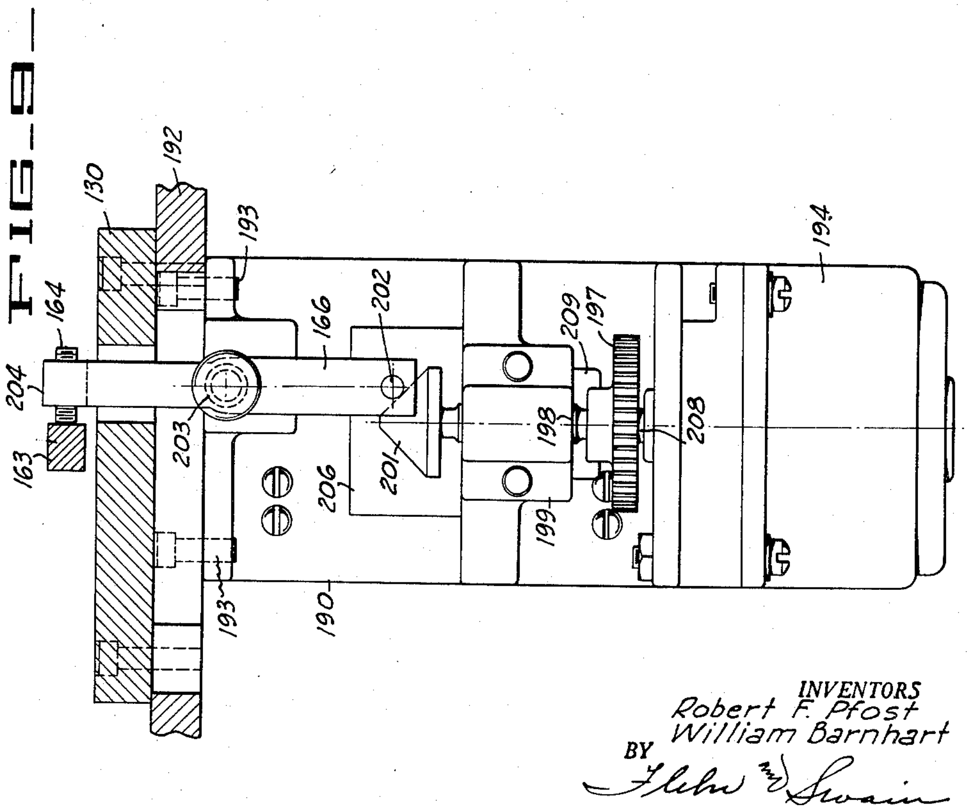
Figure 9 is an enlarged end view showing the tape guide positioning apparatus illustrated in Figures 4 and 5.

The arcuate surface 144 of the guide member 21 is preferably provided with an arrangement of grooving or recesses as shown in Figure 4. Thus, a groove 177 is formed in a plane corresponding to the plane of rotation of the transducer unit 16. Additional grooves 178 are provided adjacent to the sides of the groove 177 and are adapted to be connected to a flexible tube 179 to a source of suction. Suction applied during normal operation, that is, during recording and/or playback operations, serves to retain the exterior side of the tape in intimate contact with the guide surface. As shown in Figure 7, an abutment 191 is provided at the lower end of the guide member 21, and serves to engage one side edge of the tape. It is assumed in this instance that the head rotates in a counter-clockwise direction as viewed in Figure 7.

It is desirable to provide pneumatic cooling for the motor. Thus, a duct 182 connects with one end of the motor housing 183 and is connected to a suitable source of suction whereby cooling air is continuously drawn through the motor windings. It is also desirable to provide pneumatic means for withdrawing dust from the tape and from the vicinity of the rotating heads. For this purpose, the housing part 138 is hollow and is connected to a similar suction duct 184, whereby air is continuously drawn from the region of contact between the head and tape thus removing dust and other fine particles from the operating region.

Operation of the transducer apparatus as described is apparent from the foregoing. During normal recording and/or playback operation, the guide is advanced toward the head, the precise position in this instance being determined by the means to be presently described in detail and which serves to automatically control the position of the arm 163. This positioning serves to control the contact pressure between the tape and transducer units to compensate for timing errors as previously described. During transport or tape rewind operations, the solenoid 167 is de-energized to retract the guide member whereby the tape is free to move.

Referring to Figures 5, 7, 9 and 10, a suitable guide positioning means is shown. The guide positioning means is mounted on the base plate 192 by a bracket 190. For example, the bracket 190 may be attached to the plate 192 by means of screws 193. A suitable motor 194 is mounted at the lower end of the bracket with its shaft extending upwardly. The motor 194 may be of the eddy current type that only operates when two phases of voltages are applied to its two windings. One phase always being present, the operation of the motor depends upon the application of the other phase as will be presently described.

The motor 194 serves to drive the spur gear 196 which engages the spur gear 197 carried by the positioning screw 198. The positioning screw 198 is threadably received in the bracket portion 199. As it is rotated, it serves to urge the cone 201 upwardly and downwardly depending upon the sense of rotation. The cone 201 engages a pin 202 carried by the actuator arm 166. The arm 166 is pivotally retained by a pin 203 and extends upwardly to have its upper end 204 lie adjacent to the arm 163. The upper end of the actuator arm 166 carries the adjusting screw 164. Thus, operation of the motor in the forward and reverse directions serves to raise and lower the cone 201 whereby the arm 166 is pivoted to urge the arm 163 inwardly and outwardly to adjust the pressure between the magnetic tape and the rotating tranducing units.

A variable resistor or potentiometer 206 has its shaft 207 coupled to the motor shaft 208 by means of a coupling 209. Rotation of the motor serves to rotate the wiper contact of the potentiometer 206 to thereby effect a change in resistance as will be presently described. The bracket 190 may also carry suitable terminal strips 210.

As previously described, a sensor unit operates in conjunction with the tape guide control system to provide an error signal which is employed to control the tape to head pressure. The error signal is derived from the reproduced signal by sensing the time displacement error caused by incorrect tape guide position. In the reproduction of television intelligence, the unit responds to the error occurring when the period between the leading edge of two horizontal sync pulses, which occur just prior and just following switching, is different from the average period between leading edges of sync pulses during the time one head is scanning across the magnetic tape. A control signal may be recorded on the transverse track portions and employed in reproduction to derive an error signal. However, the descrpition to follow is based on the reproduction of a video television signal.

Figure 13:
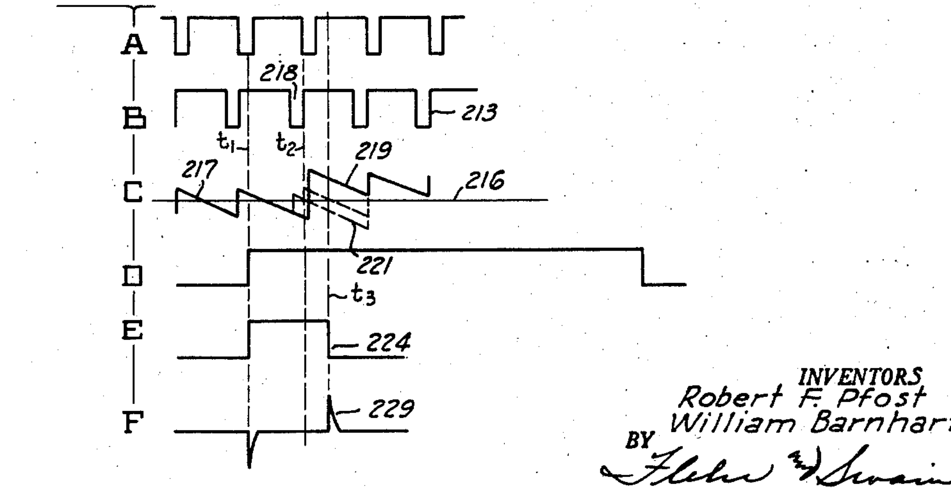
Figure 13 shows the waveforms at various parts of the circuits illustrated in Figures 14 and 15 which form the error signal.
Figure 14:
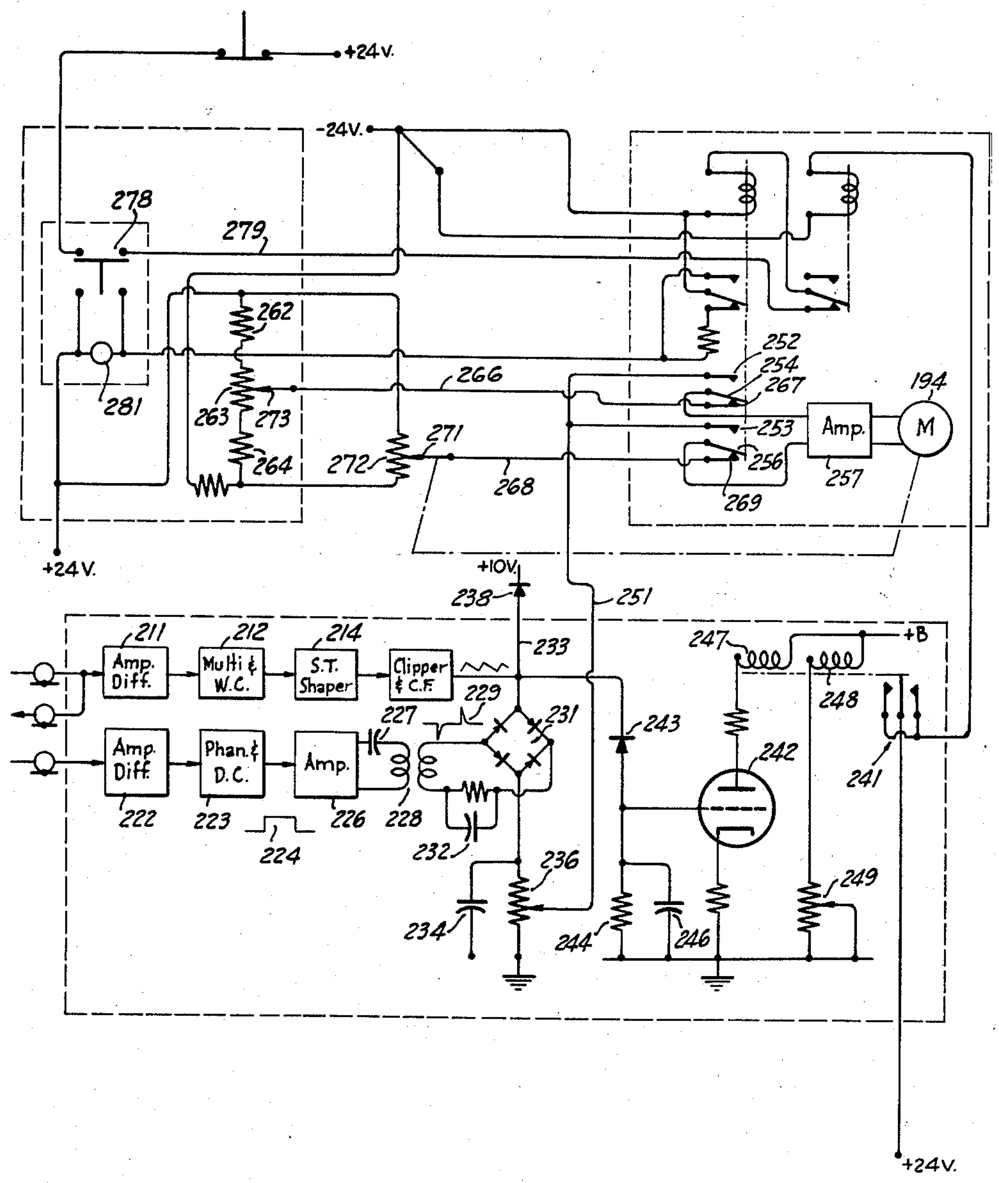
Figure 14 is a schematic circuit diagram, partly in block form, illustrating the sensor unit which derives the error signal from the reproduced signal.

Referring to Figure 14, sync pulses from the processing amplifier are applied to the amplifier-differentiator 211 which forms triggering pulses. These pulses are applied to the monostable multivibrator 212 which, in normal operation, is adjusted to produce a pulse of approximately 57.5 microseconds duration. Since horizontal sync pulses have a spacing of 63.5 microseconds, there is a six microsecond interval between the time that the multivibrator reverts to its stable condition and the time it is again triggered by a triggering pulse from the amplifier-differentiator 211. Referring to Figure 13, the horizontal sync pulses are shown in Figure 13A, while the waveform appearing at the output of the multivibrator is shown at 13B. The pulse 213 is a negative going pulse having a duration of six microseconds.

These pulses are applied to a saw-tooth generator 214 which may comprise a tube which is normally conducting heavily and which is cut off by the negative going pulse 213. When the tube is cut off, the plate voltage rises rapidly towards the plate supply voltage. Generally, circuits connected to this tube are chosen whereby a condenser is charged at a rate of approximately 11.5 volts per microsecond, as will be presently described. Thus, if the time of the negative going pulse 213 is varied, the capacitor will charge to a higher or lower value than the normal value which it attains in the six microseconds interval. For example, an error of one microsecond in spacing of the sync pulses which starts the multivibrator will give a charge in time which is one microsecond greater or less than the six microseconds normal time. At the charging rate referred to above, this means a difference in peak voltage of the signal of 11.5 volts.

The spikes are employed to charge an RC circuit to its peak value. The circuit is adjusted to decay approximately seven volts for a sixty microsecond interval. Thus, a saw-tooth of seven volts peak to peak is formed. The saw-tooth is illustrated in Figure 13C. It is seen that the saw-tooth varies around a reference level 216. The point of cross-over of the decaying sides 217 of the saw-tooth for correct timing will always occur a predetermined time after the peak of the saw-tooth wave. Such a point exists at approximately 80 microseconds after the head switching time $t_1$, Figure 13. This time is defined by the leading edge of the 480 cycle switching pules as shown in Figure 13D. If an error exists, the time $t_2$ will occur slightly before or after the normal time of occurrence allowing the circuit to charge to a higher or lower value. The waveform at the time $t_3$ will give an error voltage when the triggering time has not occurred at the proper time. For example, referring to Figure 13C, if the horizontal sync pulse 218 occurs at a later time than normal, then the saw-tooth waveform will not cross the axis at the time $t_3$ as is indicated by the dotted line for normal timing. The waveform will have a positive voltage as indicated at time $t_3$. If the saw-tooth waveform is sampled at this time, a positive output voltage is obtained. Similarly, if the horizontal sync pulse 218 occurs prior to the normal time, a negative output voltage, indicated by the sash line 221, will be obtained when the waveform is sampled.

It is seen that the sampling signal must be related timewise to the leading edge of the 480 cycle switching pulse which establishes the time $t_1$. The 480 cycle switching pulse is applied to an amplifier-differentiator which amplifies and differentiates the pulse to deliver a series of positive triggering pulses to the phanastron delay circuit 223. The phanastron delay circuit provides an output voltage pulse 224 whose width is controllable. The trailing edge of the pulse 224, Figures 14 and 13E, establishes the sampling time $t_3$.

The output of the phanastron is applied to an amplifier 226 whose output is capacitively coupled 227 to the primary of the transformer 228. Positive and negative going spikes, as indicated at 229, Figures 13F and 14, appear at the secondary of the transformer. The first spike corresponds to the leading edge of the phanastron pulse and has no effect on the sampling circuit 231. The sampling circuit 231 comprises four diodes connected in a bridge circuit. The negative going spike is of such a polarity that none of the diodes conduct. However, during the positive spike which occurs at the termination of the phanastron pulse, time $t_3$, the diodes forming the bridge circuit 231 conduct through both branches of the circuit thereby allowing the condenser 232 to charge up. The voltage across this condenser builds up to the peak value of the spoke and provides a back bias to the diode bridge during non-pulse time. Because of the back bias, the signal waveform appearing at the top of the bridge, line 233, is completely isolated from other nodes of the bridge during the non-pulse interval provided only that the voltage waveform at this point does not exceed the back bias potential. During the interval of the second spike 229, the circuit acts as a closed switch permitting the capacitor 232 to be charged by the spike and permitting the capacitor 234 to charge up towards the sampled voltage from the saw-tooth wave. The voltage appearing across this capacitor 234 is the required error signal needed to drive the tape guide amplifier to be presently described. The potentiometer 236 allows adjustment of the error signal level applied to the tape guide amplifier.

The pulse appearing on the line 233 is such that noise pulses can cause large positive spikes of voltage to occur. If allowed to exist, these spikes would overcome the back bias of the sampling circuit and produce erratic fluctuation of the error signal. To prevent this, a crystal diode 238 is introduced to clip the waveform at approximately 10 volts, well within the limitations of the back bias voltage.

The error signal developed by the unit is integrated over a considerable number of cycles and the random noise in the reproduced signal will have no effect on it. However, if the picture becomes badly degraded such as a loss of the signal from one of the reproduced heads, or if the video signal ends, means are provided to switch the tape guide control from the automatic node to a manual operation.

For this purpose a protective relay 241 is used in conjunction with a triode amplifier 242. With a normal signal appearing at the line 233, a negative bias is developed on the grid of the tube 242 by the combination of diode 243 and the resistive capacitive circuit comprising resistor 244 and capacitor 246. A few mils of current are allowed to flow through one coil 247 of the differential relay which also includes a coil 248. By adjusting the current through the opposing coil 248 with the potentiometer 249, the relay may be adjusted to remain open allowing automatic operation of the tape guide system while the relay is open. If the video signal fails completely, no signal will appear at the line 233, the bias on the tube 242 will become zero causing more current to flow in the relay. The relay 241 is closed in one direction and causes the system to revert to manual operation, as will be presently described. If, on the other hand, the signal becomes too noisy and excessive negative peaks appear on the lead 233, this will cause the bias on the tube 242 to increase thereby reducing the current through the coil 247 and causing the relay to close in the opposite direction and again cause the apparatus to revert to its manual operating condition.

The output error signal which appears on the variable tap of the potentiometer 236 is applied along the line 251 to the contacts 252 and 253 of a relay. As shown, the relay is in the manual operating position. When the movable contacts 254 and 256 are moved in their upward position, then the amplifier 257 is connected to receive this output error signal.

The amplifier 257 is a chopper type amplifier suitable for developing a signal for one of the windings of the motor 194. When the output voltage on the line 251 is of one polarity, the amplifier will develop an output signal which is in phase with the signal applied to the other winding of the motor to cause the motor 194 to rotate in one direction. When the polarity of the error signal on the line 251 is reversed, the amplifier 257 develops a signal of opposite phase which causes the motor 194 to rotate in an opposite direction. At balance, that is when no input is applied along the line 251, the output of the amplifier is such that the motor 194 remains stationary.

As previously described, rotation of the motor 194 serves to position the tape guide whereby the timing errors are corrected. In manual operation, that is the position of the various relays as indicated in the drawing, one input signal for the amplifier is derived across the voltage divider comprising the resistors 262, 263 and 264. The resistor 263 is connected as a potentiometer whereby the voltage appearing on the line 266 may be varied. A positive voltage is applied to the upper end of the resistors and a negative voltage to the lower end whereby the output along the line 266 may be adjusted to be zero, positive or negative. The voltage on the line 266 is applied to the relay terminal 267. The voltage appearing on line 268 is applied to the relay terminal 269. The voltage on the line 268 is the voltage appearing on the variable tap 271 of the potentiometer 272 which is connected to the same voltage sources. The arm 271 is driven by the motor 194. Thus, in the manual adjusting position the variable tap 273 of the potentiometer 263 is manually adjusted and the motor automatically serves to move the tap 271 to obtain balance. As the motor rotates, it positions the guide 21.

Figure 3:
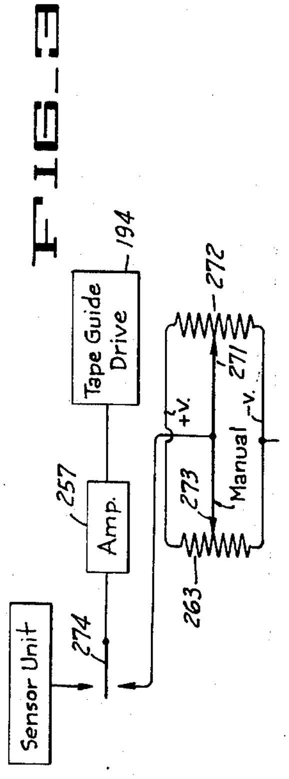
Figure 3 is a block diagram schematically illustrating the tape to head pressure control system.

The operation is more clearly illustrated in the schematic block diagram of Figure 3. The resistors 263 and 272 are schematically shown connected in a bridge circuit with positive and negative voltages applied to the two terminals of the same. The variable tap 273 is associated with the resistor 263 and the variable tap 271 is associated with the resistor 272. Thus, by manually adjusting the tap 273, the bridge is unbalanced and will be driven into a balanced condition by the tape guide drive which in this instance comprises the motor 194 which drives the potentiometer arm. The switch arm 274 is in the down position in this instance thereby applying the signal to the amplifier 257 as previously described. When the arm 274 is in the up position, it is connected to the sensor unit which develops the error signal to automatically move the tape guide as previously described.

Referring to Figure 14, the apparatus may be set to the manual control position by moving the switch contact 278 to close the line 279. When the line is open, the circuit is in the automatic operation and the light 281 indicates that the circuit is connected in automatic compensation position.

It should be observed that the automatic compensation is employed only during playback. In summary, in manual operation the tape guide position is controlled by varying the potentiometer tap 273. This potentiometer is one branch of a self-balancing circuit, the other branch of which is the potentiometer driven by the motor 194. A change in the position of the control creates an unbalance in the bridge and the motor acts to rebalance the bridge, and a new tape guide position is established.

In automatic operation, the tape guide position is controlled by the output of the automatic compensation sensor. This unit senses time displacement errors in the reproduced signal caused by incorrect tape guide position. The error voltage is in the form of a D.-C. voltage whose amplitude and polarity are direct functions of the amount and direction of time displacement error in the signal. When applied to the tape guide amplifier, this error signal causes the motor to rotate so as to correct the tape guide position.

Figure 15:
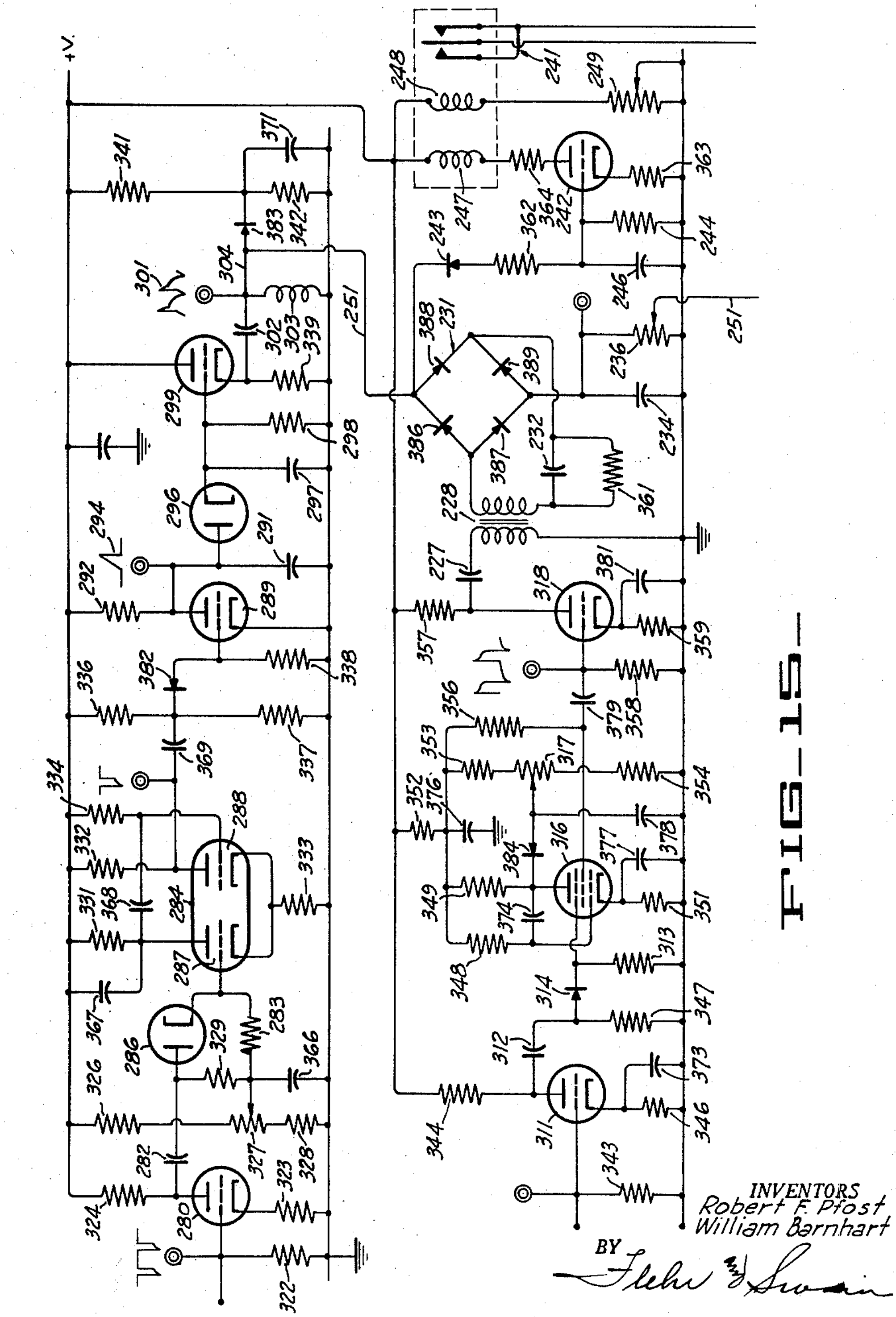
Figure 15 is a detailed circuit diagram of a suitable sensor unit.

Referring to Figure 15, a complete circuit diagram of the sensor is shown. The sync pulses are applied to the grid of the tube 280 which acts as an amplifier. The pulses are differentiated by the capacitor 282 and resistor 283 to provide triggering pulses for the monostable multivibrator which includes the tube 284. The diode 286 serves to remove the negative going portions of the differentiated waveform. The triggering pulses applied to the grid of the triode 287 of the monostable multivibrator are positive going spikes corresponding to the leading edge of the horizontal sync pulses.

The multivibrator in normal operation is adjusted to provide pulses of 57.5 microseconds duration as previously described. Since the horizontal sync pulses have a spacing of 63.5 microseconds, there are six microseconds between the time the multivibrator reverts and the time it is again triggered. As a consequence, a waveform of the type shown in Figure 13B appears at the plate of the tube section 288. This pulse is applied to the grid of the tube 289 which is biased to conduct heavily; its plate being maintained at approximately 50 volts. For the six microsecond interval between pulses, the tube is cut off allowing the capacitor 291 to charge up through the resistor 292. The RC constant of the capacitor 291 and resistor 292 is so chosen that at the end of the six microsecond pulse it will have the steepest possible slope, a charge rate of approximately 11.5 volts per microsecond. At the end of the six microsecond pulse, the tube again conducts quickly discharging a condenser. The result is a series of pulses or spikes occurring at the horizontal line rate whose peak to peak amplitude is constant provided the period between leading edge of the horizontal pulse remains constant.

If the tape guide is misadjusted to provide a time error of .1 microsecond as the heads are switched, it will cause a .1 microsecond change in the saw-tooth charge time. Since the tip of the saw-tooth has a charge slope of 11.5 volts per microsecond, an amplitude variation in the order of a one volt will occur at the tip of the spike every time a head is switched.

The spikes are applied through a diode 296 to a condenser 297. This condenser is charged to the peak value of each sawtooth pulse 294. The resistor 298 allows the charge to decay at a rate of about seven volts during a line interval. In this way the tips of the spikes are preserved. The impedance of the cathode of tube 296 is so high that a cathode follower 299 is used to isolate the circuit to provide a low impedance output of the sawtooth tips, as indicated at 301. The capacitor 302 together with the inductance 303 constitutes a high pass filter to remove the low frequency microphonic introduced by the preceding circuitry.

As previously described, it is desired to sample the waveform appearing on the line 304 at a particular time after the start of a horizontal sync pulse in order to derive an error signal of correct polarity. For this purpose the 480 cycle switching signal is applied to the grid of the tube 311 which is connected as an amplifier. The amplified signal is differentiated by the combination of capacitor 312 and resistor 313. The diode 314 serves to clip negative going spikes whereby only positive triggering pulses are applied to the phanastron delay circuit including the tube 316. The output of the phanastron provides approximately 75 volts positive pulses whose width is controlled by means of the potentiometer 317 The trailing edges of these pulses establish the sampling time, $t_3$, previously described.

The output of the phanastron is applied to an amplifier including the tube 318 which serves to isolate the sampling circuit. The transformer functions to isolate the diode clamping circuit previously described from ground and to differentiate the squarewave input thereto. Operation of the sampling circuit 231 to act as a switch in response to pulses applied thereto from the phanastron circuit was previously described. The sampling circuit 231 serves to connect the capacitor 234 to be charged by the error signal appearing on the line 304 as previously described. The circuit acts to sample the sawtooth voltage derived from the sync pulses at a particular time to derive an error signal when time displacement errors are present.

An automatic compensation sensor was constructed in accordance with the foregoing in which the various components had the following values.

Voltage $+V=+250$ volts

| | | |
|---|---|---|
| Tubes: | | |
| 281 | | ½ 12AT7 |
| 286 | | ½ 6AL5 |
| 288 | | 12AU7 |
| 289 | | ½ 5687 |
| 296 | | ½ 6AL5 |
| 299 | | ½ 5687 |
| 311 | | ½ 12AU7 |
| 316 | | 6AS6 |
| 318 | | ½ 12AU7 |
| Resistors: | | |
| 236 | ohms | 50K |
| 244 | ohms | 330K |
| 249 | ohms | 147K |
| 283 | ohms | 10K |
| 292 | ohms | 5K |
| 298 | megohms | 22 |
| 313 | ohms | 47K |
| 317 | ohms | 25K |
| 322 | ohms | 100K |
| 323 | ohms | 150 |
| 324 | ohms | 10K |
| 326 | ohms | 100K |
| 327 | ohms | 5K |
| 328 | ohms | 8200 |
| 329 | ohms | 100K |
| 331 | ohms | 10K |
| 332 | ohms | 10K |
| 333 | ohms | 3300 |
| 334 | megohms | 10 |
| 336 | ohms | 470K |
| 337 | ohms | 470K |
| 338 | megohm | 1 |
| 339 | ohms | 27K |
| 341 | ohms | 68K |
| 342 | ohms | 1800 |
| 343 | ohms | 270K |
| 344 | ohms | 10K |
| 346 | ohms | 1K |
| 347 | ohms | 470K |
| 348 | megohm | 1 |
| 349 | ohms | 39K |
| 351 | ohms | 820 |
| 352 | ohms | 8200 |
| 353 | ohms | 6.8K |
| 354 | ohms | 33K |
| 356 | ohms | 4.7K |
| 357 | ohms | 6800 |
| 358 | ohms | 470K |
| 359 | ohms | 1200 |
| 361 | megohms | 4.7 |
| 362 | ohms | 2700 |
| 363 | ohms | 330 |
| 364 | ohms | 22K |
| Capacitors: | | |
| 227 | mmf | 800 |
| 232 | mf | .01 |
| 234 | mf | 0.47 |
| 246 | mf | 8 |
| 282 | mmf | 27 |
| 291 | mf | .002 |
| 297 | mmf | 100 |
| 302 | mf | .22 |
| 312 | mmf | 27 |
| 366 | mf | 10 |
| 367 | mmf | 47 |
| 368 | mmf | 40 |
| 369 | mmf | 500 |
| 371 | mf | 10 |
| 373 | mf | 1.0 |
| 374 | mf | .001 |
| 376 | mf | 10 |
| 377 | mf | .001 |
| 378 | mf | .01 |
| 379 | mf | .01 |
| 381 | mf | .002 |
| Crystal diodes: | | |
| 243 | | 1N279 |
| 314 | | 1N279 |
| 382 | | 1N432 |
| 383 | | 1N68A |
| 384 | | 1N68A |
| 386 | | 1N432 |
| 387 | | 1N432 |
| 388 | | 1N432 |
| 389 | | 1N432 |
| Inductor: | | Millihenry |
| 391 | | 100 |

A sensor constructed in accordance with the foregoing was capable of detecting time displacement errors as small as .05 msec. and of providing output D.-C. voltages having a magnitude of .25 v. A complete recording and reproducing system was constructed in accordance with the foregoing and employed to record a monochrome television program. The effect of timing errors (Venetian-blind effect) was negligible in the reproduced signal.

As previously described, the tape guide control system may be employed when reproducing signals other than television signals. A recorded signal which includes signal portions having a known frequency separation may be applied to the sensor of Figure 3. The sensor serves to derive an error signal which is dependent upon the known frequency error (time displacement error) in the reproduced signal. For example, a standard frequency may be superposed and recorded with the signal intelligence. Upon reproduction, this signal can act as the reference frequency in the same manner as the horizontal sync pulses act as a reference frequency in the system described. Operation of the automatic compensation system in other respects is similar to that described above.

Thus, it is seen that an improved recording and reproducing apparatus is provided. A servo system automatically adjusts the pressure between the tape and transducing units in response to an error signal derived from the reproduced signal. The control of pressure serves to automatically correct for time displacement errors which arise from variations in head to tape pressure due to errors in positioning of the tape guide means, tape stretching and the like.

We claim:

1. In tape transducing apparatus of the type adapted to reproduce a recorded signal, at least one transducer unit serving to reproduce the recorded signal, rotary means for mounting said unit, guide means serving to guide the tape whereby it is presented for contact with the transducer unit, means serving to adjust the position of the guide means relative to the path of movement of the transducer unit, means serving to receive the reproduced signal and serving to move said guide position adjusting means to control the pressure between the tape and transducing unit thereby compensating for timing errors in the reproduced signal.

2. In tape transducing apparatus of the type adapted to reproduce a recorded signal, at least one transducer unit serving to reproduce said signal, rotary means for mounting said unit, guide means serving to guide the tape whereby it is presented for contact with the transducer unit, and means serving to adjust the position of the guide means in response to a timing error signal derived from the reproduced signal to thereby control the pressure between the transducer unit and the tape.

3. In tape transducer apparatus of the type adapted to reproduce a recorded signal, a plurality of transducer units serving to reproduce the recorded signal, a rotary head serving to carry said units, guide means adapted to engage the tape and present the same for contact with the transducer units, means serving to receive the reproduced signal and serving to derive an error signal proportional to time displacement errors in the reproduced signal, and means responsive to the error signal serving to adjust the position of the guide means relative to the path of movement of the transducer units whereby the pressure between the transducer units and the tape is controlled.

4. Tape transducing apparatus of the type adapted to reproduce a recorded signal comprising a plurality of transducer units serving to reproduce the recorded signal, a rotary head serving to carry said units whereby the units sweep through circular paths, tape engaging and guiding means adapted to guide a length of tape for movement in proximity with the circular sweep path of said transducer units, means serving to receive at least a portion of the reproduced signal and serving to derive an error signal which is dependent upon time displacement errors in the reproduced signal, adjusting means, and means responsive to the error signal serving to adjust the radial position of said guide means relative to the path of movement of the transducer units whereby the pressure between the transducer units and the tape is controlled.

5. In tape transducing apparatus of the type adapted to reproduce a recorded signal, a plurality of transducing units serving to reproduce the recorded signal, a base, a rotatable transducer mounting head carried by said base, said transducer units being carried by said mounting head whereby said units sweep through circular paths, tape engaging and guiding means adapted to guide a length of curved tape for movement in proximity with the circular sweep path of said units, means serving to support said guide means on said base for limited movement of the guide means between one limiting position in which the guide means presents the tape for operating contact with the tips of the transducer units and in the other limiting position the tape is retracted from such contact and free to move lengthwise, means serving to develop an error signal which is dependent upon timing errors in the reproduced signal, and means responsive to the error signal for adjusting the position of said guide means relative to the transducer units at the second limiting position.

6. In tape transducing apparatus of the type adapted to reproduce recorded signal information including a timing reference, a plurality of transducer units serving to reproduce the recorded signal, a rotary head serving to carry said units whereby the units sweep through circular paths, tape engaging and guiding means adapted to guide a length of curved tape for movement in proximity with the circular sweep paths of the transducing units, means serving to receive said timing reference and derive an error signal corresponding to time displacement errors in said reproduced signal, and means responsive to the error signal for adjusting the position of said guide means relative to the transducing units.

7. In reproducing apparatus for reproducing video signals of the type which include horizontal sync pulses, a plurality of transducer units serving to reproduce said signals, rotary means for mounting said units, guide means serving to guide the tape whereby it is presented for contact with the transducer units, means serving to receive said sync pulses and form an output error signal which is dependent upon timing errors occurring between two adjacent horizontal sync pulses, and means responsive to said error signal serving to adjust the position of the guide means relative to the path of movement of the transducer units.

8. In magnetic tape transducing apparatus of the type adapted to reproduce a recorded video signal of the type including horizontal sync pulses, a plurality of transducing units serving to reproduce said recorded signal, a rotary head assembly serving to carry said units, guide means adapted to engage the tape to present the same for contact with the transducing units whereby the units sweep successively across the tape, means serving to develop switching pulses, means responsive to said switching pulses serving to switch from one transducer unit to another as they sweep successively across the tape, means serving to receive the horizontal sync pulses of the reproduced signal and serving to form an output waveform which varies about a reference level, means responsive to said switching pulses for periodically sampling said waveform, means serving to receive said sampled waveform and serving to form an output error signal which is proportional to time displacement errors in the reproduced signal, and means serving to receive said error signal and serving to adjust the position of the guide means relative to the path of movement of the transducer units whereby the pressure between the transducer units and the tape is controlled.

9. In magnetic tape transducing apparatus of the type adapted to reproduce a recorded video signal of the type including horizontal sync pulses, a plurality of transducing units serving to reproduce said recorded signal, a rotary head assembly serving to carry said units, guide means adapted to engage the tape to present the same for contact with the transducing units whereby the units sweep successively across the tape, means serving to develop switching pulses, means responsive to said switching pulses serving to switch from one transducer unit to another as they sweep successively across the tape, means serving to receive the horizontal sync pulses of the reproduced signal and serving to form an output waveform which varies about a reference level, means responsive to said switching pulses for periodically sampling said waveform, means serving to receive said sampled waveform and serving to form an output error signal which is proportional to time displacement errors in the reproduced signal, amplifying means serving to receive said error signal, and means serving to receive said amplified error signal and serving to adjust the position of the guide means relative to the path of movement of the transducer units whereby the pressure between the transducer units and tape is controlled.

10. In magnetic tape transducing apparatus of the type adapted to reproduce a recorded video signal of the type including horizontal sync pulses, a plurality of transducing units serving to reproduce said recorded signal, a rotary head assembly serving to carry said units, guide means adapted to engage the tape to present the same for contact with the transducing units whereby the units sweep successively across the tape, means serving to develop switching pulses, means responsive to said switching pulses serving to switch from one transducer unit to another as they sweep successively across the tape, means serving to receive the horizontal sync pulses of the reproduced signal and serving to form an error signal when the period between the leading edges of two horizontal sync pulses which occurs just prior and just following head switching differs from the average period between leading edges of sync pulses during the time one head is scanning across the tape, and means serving to receive said error signal and serving to adjust the position of the guide means relative to the path of movement of the transducer units whereby the pressure between the transducer units and the tape is controlled.

11. Tape transducing apparatus of the type adapted to reproduce a recorded signal, at least one transducer unit serving to reproduce said signal, rotary means for mounting said unit, means serving to guide the tape whereby it is presented for contact with the transducer unit, and means responsive to a timing error signal derived from the reproduced signal to control the pressure between the transducer unit and tape.

12. Tape transducing apparatus of the type adapted to reproduce a recorded signal comprising a plurality of transducer units serving to reproduce the recorded signal, a rotary head serving to carry said units whereby the units sweep through circular paths, tape engaging and guiding means adapted to guide a length of tape for movement in proximity with the circular sweep path of said transducer units, means serving to receive at least a portion of the reproduced signal and serving to derive an error signal which is dependent upon time displacement errors in the reproduced signal, means responsive to the error signal serving to control the pressure between the tape and transducing units thereby compensating for errors in the reproduced signal.

13. In reproducing apparatus for reproducing video signals of the type which includes horizontal sync pulses, a plurality of transducer units serving to reproduce said signals, rotary means for mounting said units, means serving to guide the tape whereby it is presented for contact with the transducer units, means serving to receive the reproduced sync pulses and form an output error signal which is dependent upon timing errors occurring between two adjacent horizontal sync pulses, and means responsive to said error signal serving to adjust the position of the tape relative to the path of movement of the transducer units.

14. In magnetic tape transducing apparatus of the type adapted to reproduce a recorded video signal of the type including horizontal sync pulses, a plurality of transducing units serving to reproduce said recorded signal, a rotary head assembly serving to carry said units, guide means adapted to engage the tape to present the same for contact with the transducer units whereby the units sweep successively across the tape, means serving to develop switching pulses, means responsive to said switching pulses serving to switch from one transducer unit to another as they sweep successively across the tape, means serving to receive the horizontal sync pulses of the reproduced signal and serving to form an output waveform which varies about the reference level, means responsive to said switching pulses for periodically sampling said waveform, means serving to receive said sampled waveform and serving to form an output error signal which is proportional to time displacement errors in the reproduced signal, and means responsive to the error signal serving to control the pressure between the transducer units and tape.

15. In tape transducing apparatus of the type adapted to reproduce a recorded signal, a transducer unit adapted to cooperate with the tape to reproduce the recorded signal, guide means serving to guide the tape whereby it is presented for contact with the transducer unit, means serving to receive the reproduced signal and serving to control the pressure between the tape and transducer unit to compensate for timing errors in the reproduced signal.

References Cited in the file of this patent

UNITED STATES PATENTS

| | | |
|---|---|---|
| 2,245,286 | Marzocchi | June 10, 1941 |
| 2,751,439 | Burton | June 19, 1956 |
| 2,809,238 | Fay | Oct. 8, 1957 |